US008086774B2

(12) United States Patent
Ohara (10) Patent No.: US 8,086,774 B2
(45) Date of Patent: Dec. 27, 2011

(54) NETWORKING APPARATUS AND COMPUTER USABLE MEDIUM THEREFOR

(75) Inventor: Kiyotaka Ohara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 247 days.

(21) Appl. No.: 12/076,576

(22) Filed: Mar. 20, 2008

(65) Prior Publication Data

US 2008/0239990 A1  Oct. 2, 2008

(30) Foreign Application Priority Data

Mar. 30, 2007  (JP) ................................ 2007-092921

(51) Int. Cl.
*G06F 13/10* (2006.01)
(52) U.S. Cl. .................. 710/74; 710/2; 710/5; 710/300
(58) Field of Classification Search .................. None
See application file for complete search history.

(56) References Cited

U.S. PATENT DOCUMENTS

| 6,928,557 | B1 | 8/2005 | Inoue et al. | |
|---|---|---|---|---|
| 7,035,954 | B1 * | 4/2006 | Duran ........................... | 710/302 |
| 7,495,793 | B2 | 2/2009 | Kojima et al. | |
| 2004/0117576 | A1 | 6/2004 | Kobayashi et al. | |
| 2005/0195435 | A1 | 9/2005 | Kojima et al. | |
| 2006/0242362 | A1 * | 10/2006 | Hanes et al. ................. | 711/115 |
| 2006/0271605 | A1 * | 11/2006 | Petruzzo ....................... | 707/201 |
| 2007/0094369 | A1 * | 4/2007 | Hanes ........................... | 709/223 |
| 2007/0162594 | A1 * | 7/2007 | Henry et al. .................. | 709/224 |
| 2008/0126595 | A1 * | 5/2008 | Davis et al. .................... | 710/19 |

FOREIGN PATENT DOCUMENTS

| JP | 2000-235459 | 8/2000 |
|---|---|---|
| JP | 2004-62796 | 2/2004 |
| JP | 2004-78359 | 3/2004 |
| JP | 2004-362366 | 12/2004 |
| JP | 2006-92492 | 4/2006 |
| JP | 2007-34551 | 2/2007 |
| JP | 2007-79968 | 3/2007 |

OTHER PUBLICATIONS

Japanese Official Action dated Jul. 5, 2011 together with an English language translation from JP 2007-092921.

* cited by examiner

*Primary Examiner* — Ilwoo Park
(74) *Attorney, Agent, or Firm* — Scully, Scott, Murphy & Presser, P.C.

(57) ABSTRACT

A networking apparatus electrically connectable with a removable device and an external device through a network is provided. The networking apparatus includes a removal instruction receiving unit to receive a disconnection instruction to electrically disconnect the removable device from the networking apparatus, an approval inquiry transmission unit to transmit an inquiry for approval for the removal of the removable device to the external terminal device, an approval receiver unit to receive the approval for removal from the external terminal device, a connection control unit to control electrical connection and disconnection between the removable device and the networking apparatus, and a disconnection unit to electrically disconnect the removable device from the networking apparatus based on the control of the connection control unit.

14 Claims, 8 Drawing Sheets

NETWORKING APPARATUS AND COMPUTER USABLE MEDIUM THEREFOR

CROSS REFERENCE TO RELATED APPLICATION

This application claims priority from Japanese Patent Application No. 2007-092921, filed on Mar. 30, 2007, the entire subject matter of which is incorporated herein by reference.

BACKGROUND

1. Technical Field

An aspect of the present invention relates to a networking apparatus, to which an external device can be attached, and a computer usable medium therefore.

2. Related Art

Among various devices to be attached to a PC (personal computer), an external device complied with USB (universal serial bus) communication standard (hereinafter referred to as a USB device) is known. Such a USB device can be electrically connected with the PC to communicate when a connector of the USB device is attached to a receptacle of the PC.

However, the connector and the receptacle being connected are not necessarily locked, therefore, the USB device can be removed from the receptacle of the PC rather easily even during the communication. When the USB device is equipped with a data storage and is removed from the PC during the communication, the data in the data storage may be damaged. Therefore, a user may be required to perform an operation to electrically disconnect the USB device and the PC to terminate the communication therebetween prior to the removal of the USB device.

Meanwhile, the USB device connected to the PC may be remotely accessed by another networking apparatus through a network when the PC is connected to the network. For example, as disclosed in Japanese Patent Provisional Publication No. 2004-78359, a USB device being attached to a networking apparatus, which is connected to a network, can be accessed and shared by a plurality of terminal devices through the network.

In the configuration disclosed in the above publication, however, a user being unaware of a remote user, who is accessing the USB device remotely from one of the terminal devices through the network, may disconnect and remove the USB device from the networking apparatus. In such a case, the communication between the terminal device and the USB device is abruptly discontinued on the remote user. Further, in a worst case, data being exchanged between the USB device and the terminal device may be lost or damaged.

SUMMARY

In view of the above drawbacks, the present invention is advantageous in that a networking apparatus, in which an unexpected disconnection of communication between the USB device and an external terminal device can be prevented, and a computer usable medium therefore are provided.

According to an aspect of the invention, there is provided a networking apparatus electrically connectable with a removable device, which is configured to perform a predetermined function based on data received via the networking apparatus, and with an external device through a network so that communication between the removable device and the external terminal device can be established through the networking apparatus. The networking apparatus includes a removal instruction receiving unit to receive a disconnection instruction to electrically disconnect the removable device from the networking apparatus so that the removable device can be safely removed from the networking apparatus, an approval inquiry transmission unit to transmit an inquiry for approval for the removal of the removable device from the networking apparatus to the external terminal device through the network when the disconnection instruction is received by the removal instruction receiving unit, an approval receiver unit to receive the approval for removal from the external terminal device through the network, a connection control unit to control electrical connection and disconnection between the removable device and the networking apparatus according to one of the approval from the external terminal device and timing scaled in the networking apparatus, and a disconnection unit to electrically disconnect the removable device from the networking apparatus based on the control of the connection control unit.

According to the above configuration, a remote user using the external terminal device is allowed to terminate the communication between the removable data storing device and the external terminal device in order to avoid a disturbance which may be caused by the connection loss. Further, the user of the networking apparatus who attempts to remove the removable data storing device can be aware that the removal of the removable data storing device is approved by the remote user, and the removable data storing device can be safely removed.

According to another aspect of the invention, there is provided a networking apparatus being electrically connectable with a removable device, which is configured to perform a predetermined function based on data received via the networking apparatus, and with an external device through a network so that communication between the removable device and the external terminal device can be established through the networking apparatus. The networking apparatus includes a data storing unit to obtain data being stored in the removable device and create to store a duplicate of the obtained data when the removable device becomes electrically connected to the networking apparatus, a first modifying unit to modify contents of the data stored in the removable device and the duplicate stored in the data storing unit according to a modifying instruction provided by the external terminal device through the network, and a second modifying unit to modify solely contents of the duplicate stored in the data storing unit according to the modifying instruction provided by the external terminal device through the network. The first modifying unit is activated when the removable device is electrically connected with the networking apparatus and the second modifying unit is activated when the removable device is electrically disconnected from the networking apparatus.

According to the above configuration, after removal of the removable data storing device from the networking device, the remote user using the external terminal device can modify the contents of the data stored in the data storing unit in a same operability with an operation to modify the contents of the data storing unit while the removable data storing device is connected with the networking apparatus. Therefore, the remote user can be prevented from being disturbed by a trouble which may be caused by the connection loss with the removable data storing device.

According to still another aspect of the invention, there is provided a computer usable medium comprising computer readable instructions to control a networking apparatus electrically connectable with a removable device, which is configured to perform a predetermined function based on data received via the networking apparatus, and with an external device through a network so that communication between the removable device and the external terminal device can be established through the networking apparatus. The computer readable instructions control the networking apparatus by executing steps of receiving a disconnection instruction to electrically disconnect the removable device from the networking apparatus so that the removable device can be safely removed from the networking apparatus, transmitting an inquiry for approval for the removal of the removable device from the networking apparatus to the external terminal device through the network when the disconnection instruction is received, receiving the approval for removal from the external terminal device through the network, controlling electrical connection and disconnection between the removable device and the networking apparatus according to one of the approval from the external terminal device and timing scaled in the networking apparatus, and electrically disconnecting the removable device from the networking apparatus based on the connection and disconnection control.

According to the above configuration, a remote user using the external terminal device is allowed to terminate the communication between the removable data storing device and the external terminal device in order to avoid a disturbance which may be caused by the connection loss. Further, the user of the networking apparatus who attempts to remove the removable data storing device can be aware that the removal of the removable data storing device is approved by the remote user, and the removable data storing device can be safely removed.

According to still another aspect of the invention, there is provided a computer usable medium comprising computer readable instructions to control a networking apparatus being electrically connectable with a removable device, which is configured to perform a predetermined function based on data received via the networking apparatus, and with an external device through a network so that communication between the removable device and the external terminal device can be established through the networking apparatus. The computer readable instructions control the networking apparatus by executing steps of obtaining data being stored in the removable device and creating to store a duplicate of the obtained data in a data storing unit of the networking apparatus when the removable device becomes electrically connected to the networking apparatus, modifying contents of the data stored in the removable device and the duplicate stored in the data storing unit of the networking apparatus according to a modifying instruction provided by the external terminal device through the network, and modifying solely contents of the duplicate stored in the data storing unit of the networking apparatus according to the modifying instruction provided by the external terminal device through the network. The contents of the data stored in the removable device and the duplicate stored in the data storing unit of the networking apparatus are modified when the removable device is electrically connected with the networking apparatus and solely the contents of the duplicate stored in the data storing unit are modified when the removable device is electrically disconnected from the networking apparatus.

According to the above configuration, after removal of the removable data storing device from the networking device, the remote user using the external terminal device can modify the contents of the data stored in the data storing unit in a same operability with an operation to modify the contents of the data storing unit while the removable data storing device is connected with the networking apparatus. Therefore, the remote user can be prevented from being disturbed by a trouble which may be caused by the connection loss with the removable data storing device.

DETAILED DESCRIPTION

Figure 1:
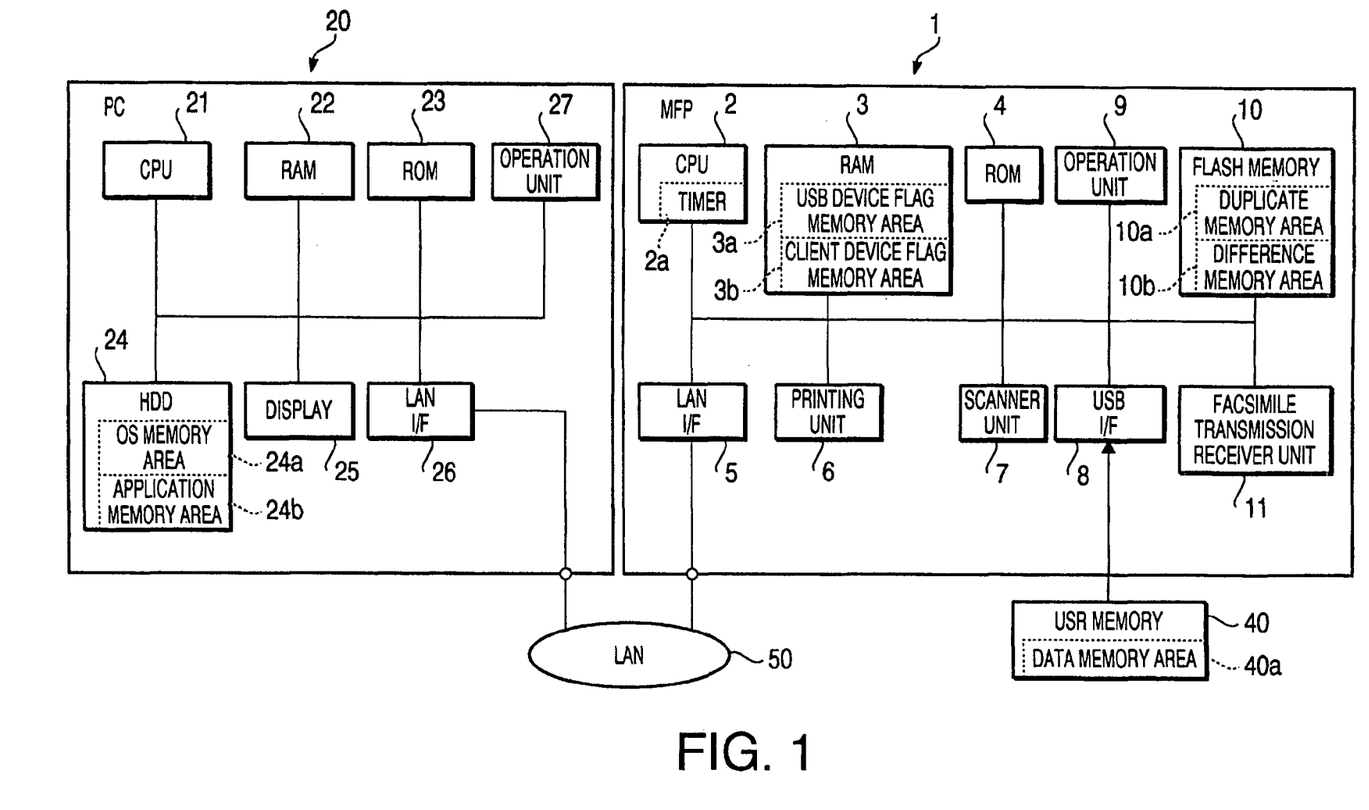
FIG. 1 schematically illustrates an electric configuration of a communication system including an MFP (multi-function peripheral) and a PC according to an embodiment of the present invention.

Hereinafter, an embodiment according to an aspect of the present invention will be described with reference to the accompanying drawings. FIG. 1 schematically illustrates an electric configuration of a communication system including an MFP 1 and a PC 20, which are connected through a LAN (local area network) 50, according to an embodiment of the present invention.

The MFP 1 is a network communication enabled apparatus having a plurality of functions including image processing functions, such as a photo-printing function using an external memory medium, an image printing function, a copying function, a scanning function, and a facsimile transmission function. As shown in FIG. 1, the MFP 1 includes a CPU 2, a RAM 3, a ROM 4, a LAN I/F (interface) 5, a printing unit 6, a scanner unit 7, a USB I/F 8, an operation unit 9, a flash memory 10, and a facsimile transmission/receiver unit 11.

The CPU 2 is a processor to execute various controlling programs, which are stored in the ROM 4, to control operations of the entire MFP 1. The CPU 2 is equipped with a timer 2a, which inputs clocks in a predetermined frequency to maintain timings of the operations according to an instruction of the CPU 2.

The RAM 3 is a memory medium to temporarily store various data such as parameters and variables necessary for the operations controlled by the CPU 2. The RAM 3 is provided with a USB device flag memory area 3a and a client terminal flag memory area 3b. The USB device flag memory area 3a stores a USB device attachment indication flag, which indicates as to whether a USB device such as a USB memory 40 is attached to the MFP 1. The client terminal flag memory area 3b stores a client terminal access indication flag, which indicates as to whether a client terminal such as the PC 20 is accessing the USB device through the LAN I/F 50. Details of the USB device attachment indication flag and the client terminal access indication flag will be described later.

The ROM 4 stores various controlling programs to be performed by the CPU 2 and various data such as fixed value data. The controlling programs concerning the USB memory 40 will be described later with reference to FIGS. 5-7.

Figure 2:
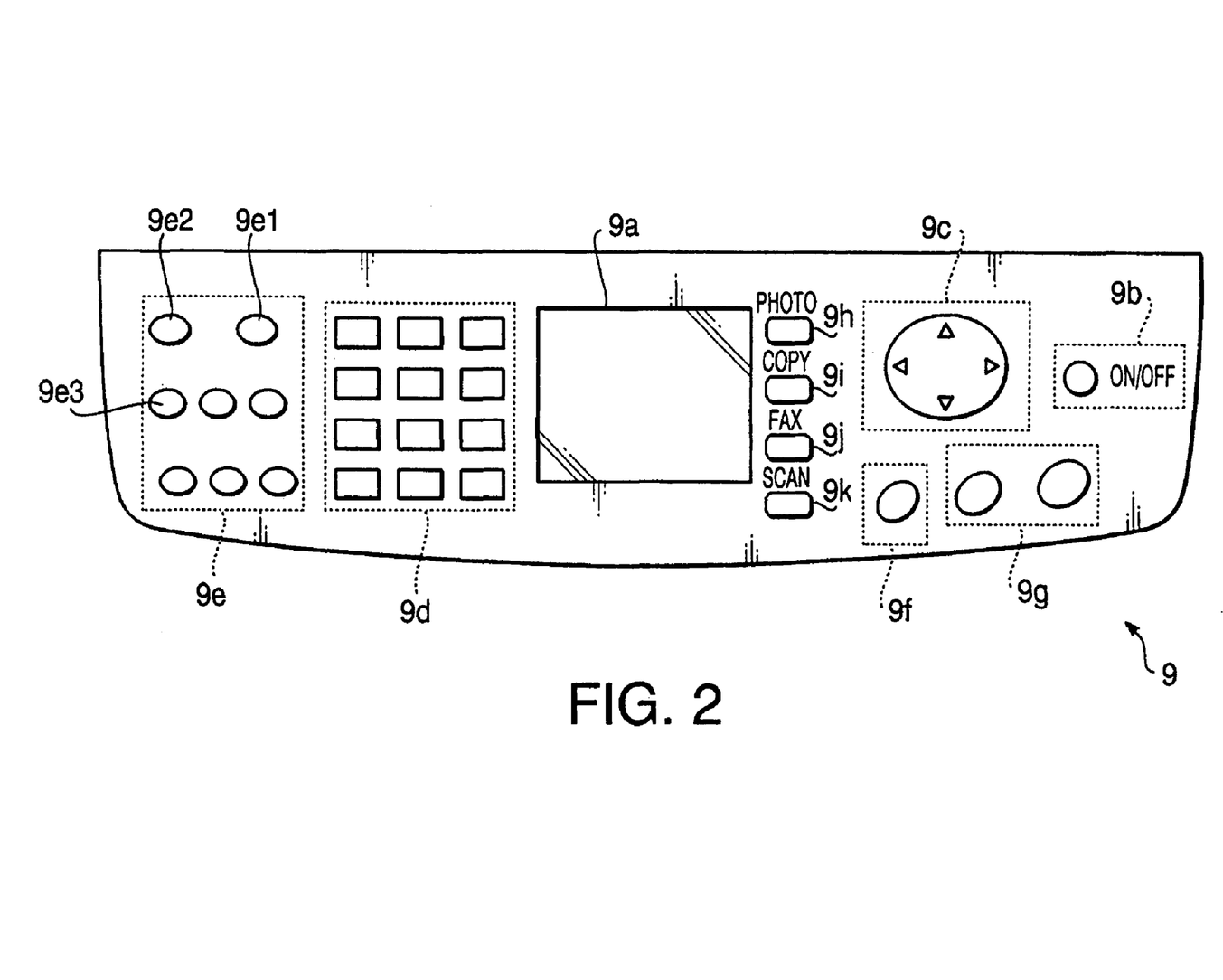
FIG. 2 illustrates an operation unit of the MFP according to the embodiment of the present invention.

The operation unit 9 includes input keys and a display (see FIG. 2). The input keys are operated by a user so that desired instructions are given to the MFP 1. Information concerning the operations in the MFP 1 is provided to the user through the display.

The flash memory 10 is a nonvolatile memory, in which various data can be written and from which the written data is read. The flash memory 10 includes a duplicate memory area 10a, in which a duplicate of data stored in the USB memory 40 is stored, and a difference memory area 10b, in which difference between the data stored in the USB memory 40 and the data stored in the duplicate memory area 10a is stored. The difference between the two data can be caused when the user modifies the duplicated data in the duplicate memory area 10a with the USB memory 40 being disconnected from the MFP 1.

The LAN I/F 5 provides an interface between the LAN 50 and the MFP 1. The data stored in the USB memory 40 and instructions provided by the PC 20 are encapsulated in an IP packet to be exchanged between the MFP 1 and the PC 20 through the LAN I/F 5.

The printing unit 6 forms an image on a recording sheet which is placed in a predetermined printing position (not shown) according to an instruction from the CPU 2. Various data representing, for example, an image and document text can be output as an image by the printing unit 6.

The scanner unit 7 scans an original image formed on a recording sheet which is placed in a predetermined scanning position (not shown) to generate image data of the original image according to an instruction from the CPU 2. The generated image data is transmitted to the PC 20 through the LAN 50.

The USB I/F 8 includes a slot (not shown) to which a USB device can be inserted so that communication between the USB device and the MFP 1 is established. In the present embodiment, the USB memory 40 as the USB device is detachably attached to the MFP 1, and the CPU 2 can communicate with the USB memory 40 through the USB I/F 8.

The USB memory 40 includes a data memory area 40a, which is a flash memory capable of storing and maintaining data even when power supply to the USB memory 40 is shut off.

The facsimile transmission/receiver unit 11 transmits and receives information concerning images to be exchanged with an external communication device (not shown). For example, the image data generated by the scanner unit 7 and data received through the LAN I/F 5 can be transmitted by the facsimile transmission/receiver unit 11 to an external device through a telephone line (not shown), and image data received by the facsimile transmission/receiver unit 11 through the telephone line can be printed by the printing unit 6.

Next, a configuration of the PC 20 will be described. The PC 20 includes a CPU 21, a RAM 22 to temporarily store various data such as parameters and variables necessary for the operations controlled by the CPU, a ROM 23 to store various controlling programs to be performed by the CPU 2 and various data such as fixed value data, an HDD (hard disk drive) 24 as a rewritable and nonvolatile data storage, an operation unit 27 including a key board and a mouse (not shown), a display 25, which is a liquid crystal display to present various information, and a LAN I/F 26 to provide an interface with the LAN 50.

The HDD 24 is provided with an OS memory area 24a to store an OS (operating system) and an application memory area 24b to store various application programs. The application programs includes a program concerning the USB memory 40, which will be described later in detail with reference to FIG. 8.

Next, referring to FIG. 2, the operation panel 9 of the MFP 1 will be described. FIG. 2 is a plane view of the operation unit 9 of the MFP 1 according to the embodiment of the present invention. The operation unit 9 includes a display 9a and keys 9b-9k. The display 9a is, for example, a liquid crystal display to display various information concerning the operations of the MFP 1. The various information to be presented to the user includes functions to be utilized and parameters to be set in the MFP 1. Examples of the information presented on the display 9a are described later in detail.

The key 9b is a power switch button, which is pressed to power on and off the MFP 1. The key 9c is a set of direction keys and an enter key, with which the user selects one of options concerning the functions and the parameters presented on the display 9a. A cursor presented on the display 9a is shifted according to a direction (left, right, up, down) inputted by the user through rim portions of the key 9c. When the cursor is on a desired option, and the user presses a center portion of the display 9c, the selection is entered. The keys 9d are numerical keys, through which the user can enter numerical information such as a telephone number identifying a receiver machine of the data to be transmitted.

The keys 9e include a USB device removal preparation button 9e1, a forcible removal button 9e2, and a client terminal connection check button 9e3, are configuration setting buttons, which are pressed to instruct a specific operation in the MFP 1. The USB device removal preparation button 9e1 is pressed by the user when the user attempts to remove the USB device from the MFP 1. If the USB device removal preparation button 9e1 is pressed when a client terminal is accessing the USB device, an inquiry for a notification to remove the USB device is transmitted to the client terminal.

The forcible removal button 9e2 is a button to be pressed by the user when the user attempts to remove the USB device from the MFP 1 without approval of the remote user through the client terminal accessing the USB device. When the forcible removal button 9e2 is pressed in addition to the USB device removal preparation button 9e1 being pressed, the remote user of the client terminal accessing the USB device is notified that the USB device will be removed without approval of the remote user and is prohibited accessing the USB device after a predetermined time period.

The client terminal connection check button 9e3 is a button to be pressed by the user when the user checks to find as to whether a client terminal to access the USB device exists. If the USB device is accessed by a client terminal, the information concerning a remote user who uses the client terminal and/or information concerning the client terminal is presented on the display 9a to the user. If no remote user to access the USB device exist when the client terminal connection check button 9e3 is pressed, a message to inform the absence is displayed on the display 9a.

The key 9f is a button to be pressed when an operation in progress in the MFP 1 needs to be ceased. The key 9g is a button to be pressed when an operation to perform one of the functions provided to the MFP 1, such as the copying function and the facsimile transmission function, is started.

The keys 9h-9k are mode selection keys, which are pressed to enter the MFP 1 in a specific functional mode. In the present embodiment, a photo-printing mode key 9h is to enter a photo-printing mode, a copy mode key 9i to enter a copying mode, a facsimile mode key 9j to enter a facsimile transmission/receive mode, and a scan mode key 9k to enter a scanning mode are included. When one of the keys 9h-pk is pressed, the MFP 1 enters the mode to implement the function which corresponds to the key being pressed.

Next, referring to FIGS. 3A-3E, information to be presented on a screen of the display 9a will be described. FIGS. 3A-3E illustrate the information (i.e., messages) to be presented to the user of the MFP 1 according to the embodiment of the present invention. The messages are displayed on the screen of the display 9a when one of the keys 9b-9k is pressed for a predetermined period of time (e.g., 5 seconds) and eliminated after the predetermined period elapses.

Figure 3A:
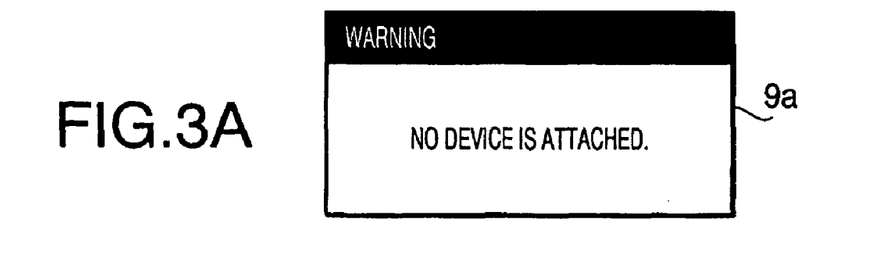
FIGS. 3A-3E illustrate information to be presented to a user of the MFP according to the embodiment of the present invention.
Figure 3B:
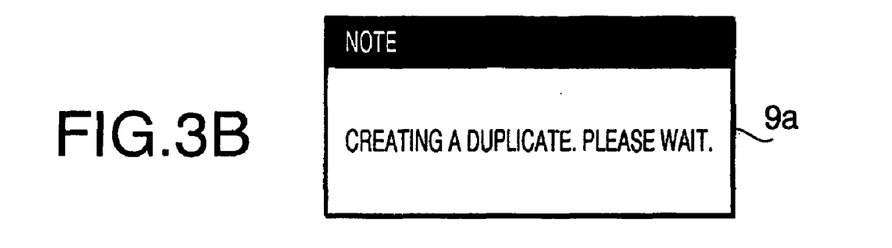
Figure 3C:
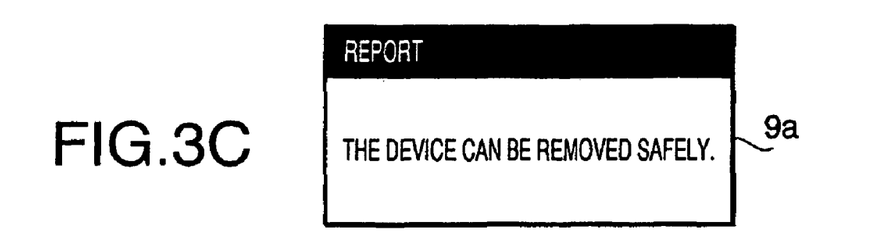
Figure 3D:
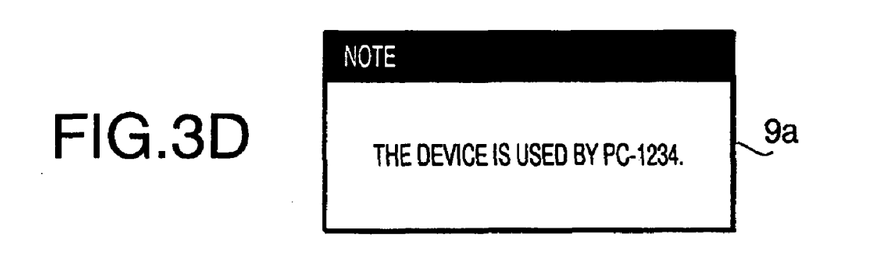
Figure 3E:
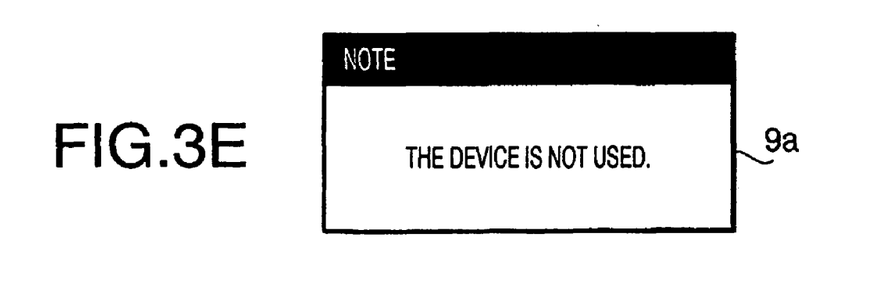

FIG. 3A illustrates a message to inform the user of the MFP 1 that no USB device is attached to the MFP 1. When the USB device removal preparation button 9e1 is pressed but no USB device is attached to the MFP 1, the message is displayed to the user. FIG. 3B illustrates a message to inform the user of the MFP 1 that a duplicate of the data stored in the USB memory 40 is being created. If the USB memory 40 is attached to the MFP 1 and no duplicate of the data stored in the data memory area 40a of the USB memory 40 has been created, a duplicate of the data is created. Creation of the duplicate may require substantial amount of time, therefore, the message to inform the status is presented to the user. FIG. 3C illustrates a message to inform the user of the MFP 1 that the USB device can be safely removed from the MFP 1. When one of the USB device removal preparation button 9e1 and the forcible removal button 9e2 along with the USB device removal preparation button 9e1 is pressed and the USB device is electrically disconnected from the MFP 1, the message is displayed to the user of the MFP 1. FIG. 3D illustrates a message to inform the user of the MFP 1 that a remote user who uses a client terminal to access the USB device exists. When the client terminal connection check button 9e3 is pressed and a remote user who uses a client terminal to access the USB device exists, the message is displayed to the user of the MFP 1. When the presence of the remote user is informed to the user of the MFP 1, the user of the MFP 1 can determine as to whether the USB device can be removed with or without approval of the remote user. FIG. 3E illustrates a message to inform the user of the MFP 1 that no remote user who uses a client terminal to access the USB device is present. When the client terminal connection check button 9e3 is pressed and no remote user to use a client terminal to access the USB device is present, the message is displayed to the user of the MFP 1. Flows in which the messages as shown in FIGS. 3A-3E are displayed will be described later in detail with reference to FIGS. 5-7.

Next, referring to FIGS. 4A-4D, information to be presented on a screen of the display 25 of the PC 20 will be described. FIGS. 4A-4D illustrate the information (i.e., messages) to be presented to a user of the PC 20 according to the embodiment of the present invention. The messages are displayed on the display 25 according to information transmitted from the MFP 1. In the present embodiment, the user of the PC 20 refers to the remote user of the USB device being attached to the MFP 1.

Figure 4A:
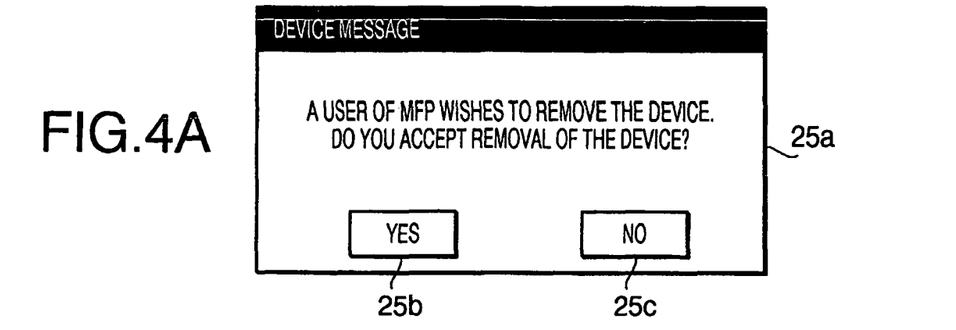
FIGS. 4A-4D illustrate information to be presented to a user of the PC according to the embodiment of the present invention.

FIG. 4A illustrates a message to inquire the remote user of the USB device for approval to remove the USB device from the MFP 1. The message is presented to the remote user when the USB device removal preparation button 9e1 is pressed by the user of the MFP 1, and information corresponding to the inquiry is transmitted from the MFP 1 to the PC 20. As shown in FIG. 4A, a window containing the message includes a "YES" button 25b and a "NO" button 25c. The remote user is thus asked to click on one of the "YES" button 25b and the "NO" button based on determination as to whether the USB device can be removed from the MFP 1. That is, the remote user clicks on the "YES" button 25b when the USB device can be removed and clicks on the "NO" button 25c when the USB device should not be removed. The window is eliminated upon the operation of the remote user.

Figure 4B:
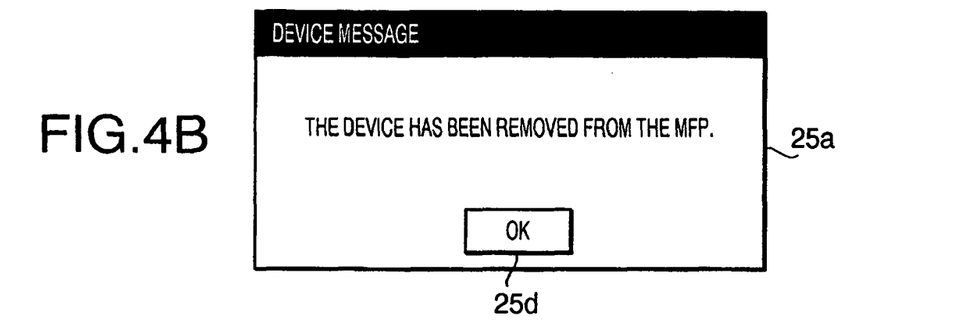

FIG. 4B illustrates a message to inform the remote user of electrical disconnection between the USB device and the MFP 1. The message is presented to the remote user when the forcible removal button 9e2 is pressed by the user of the MFP 1, and information corresponding to the operation is transmitted from the MFP 1 to the PC 20. As show in FIG. 4B, a window containing the message includes an "OK" button 25d. The remote user who is informed of the electrical disconnection of the USB device is thus prompted to click on the "OK" button 25d when the remote user recognizes the message. The window is eliminated upon the operation of the remote user.

Figure 4C:
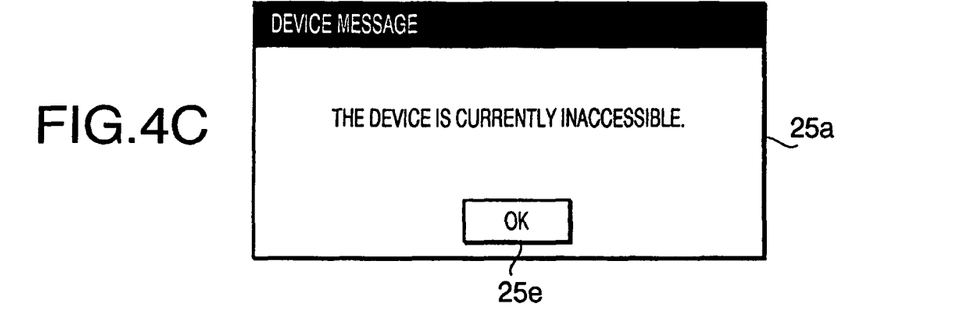

FIG. 4C illustrates a message to inform the remote user that the USB device is inaccessible to the PC 20. The message is presented to the remote user when the PC 20 cannot access the USB device due to a certain cause, such as that the USB device is in use by a third user who is remotely accessing the USB device through the LAN 50. As shown in FIG. 4C, a window containing the message includes an "OK" button 25e, which is clicked on by the remote user when the remote user recognizes the message. The window is eliminated upon the operation of the remote user.

Figure 4D:
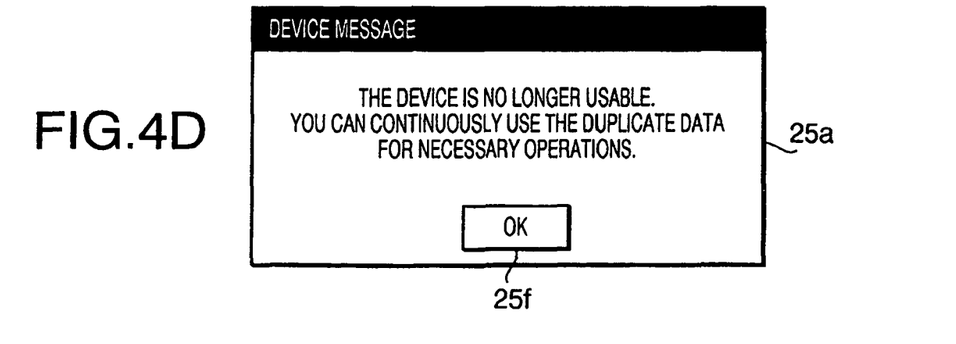

FIG. 4D illustrates a message to inform the remote user that the USB memory 40 is no longer usable and an operation to be given by the remote user through the PC 20 will be performed on the duplicated data, which is stored in the duplicate memory area 10a instead of the data stored in the data memory area 40a of the USB memory 40. The message is presented to the remote user when the forcible removal button 9e2 along with the USB device removal preparation button 9e1 is pressed by the user of the MFP 1, and the USB device is electrically disconnected from the MFP 1. As shown in FIG. 4D, a window containing the message includes an "OK" button 25f, which is clicked on by the remote user when the remote user recognizes the message. The window is eliminated upon the operation of the remote user. A flow in which the messages as shown in FIGS. 4A-4D are displayed will be described later in detail with reference to FIG. 8.

Figure 6:
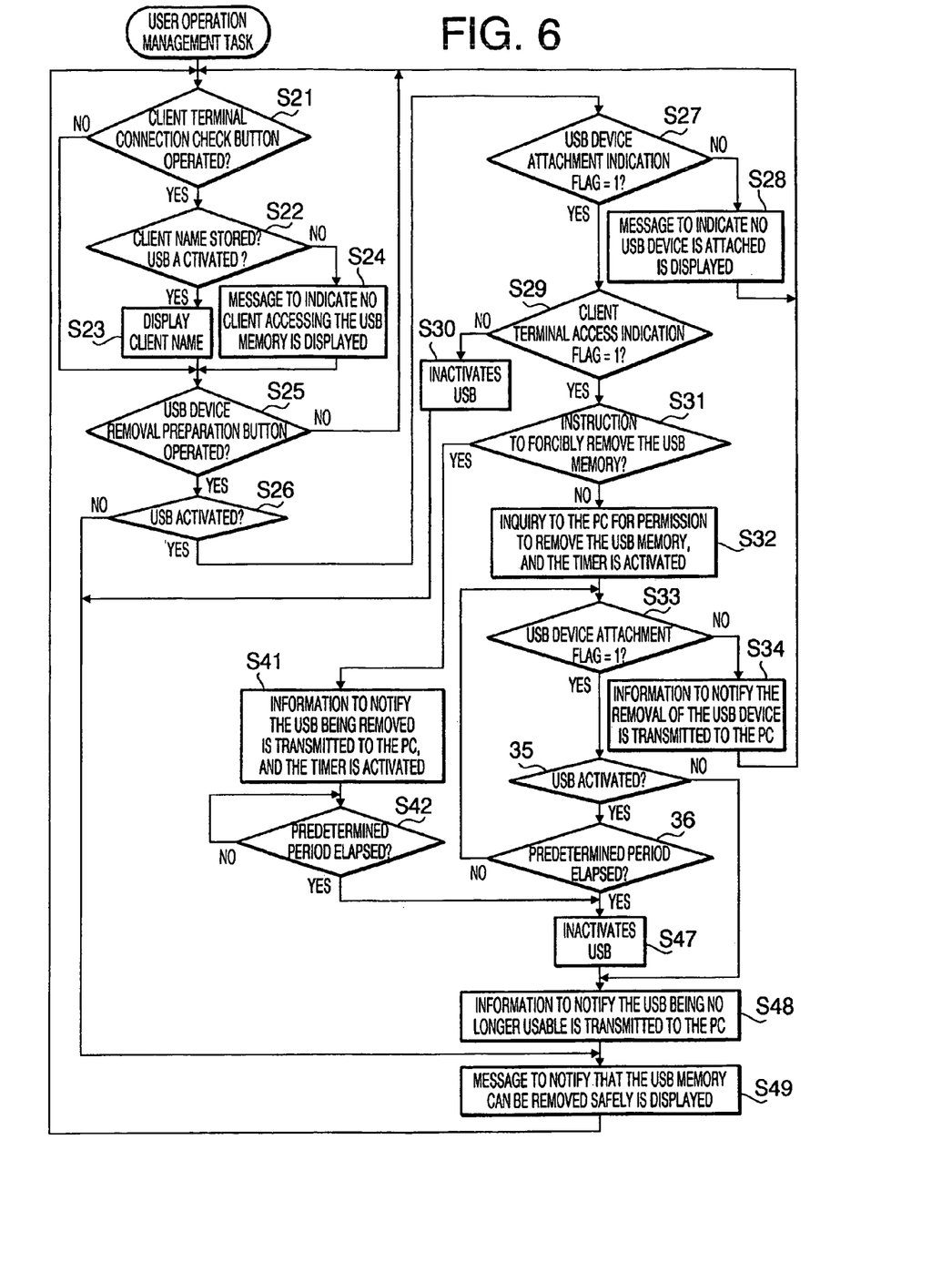
FIG. 6 is a flowchart to illustrate a user operation management task to be performed by the MFP according to the embodiment of the present invention.
Figure 7:
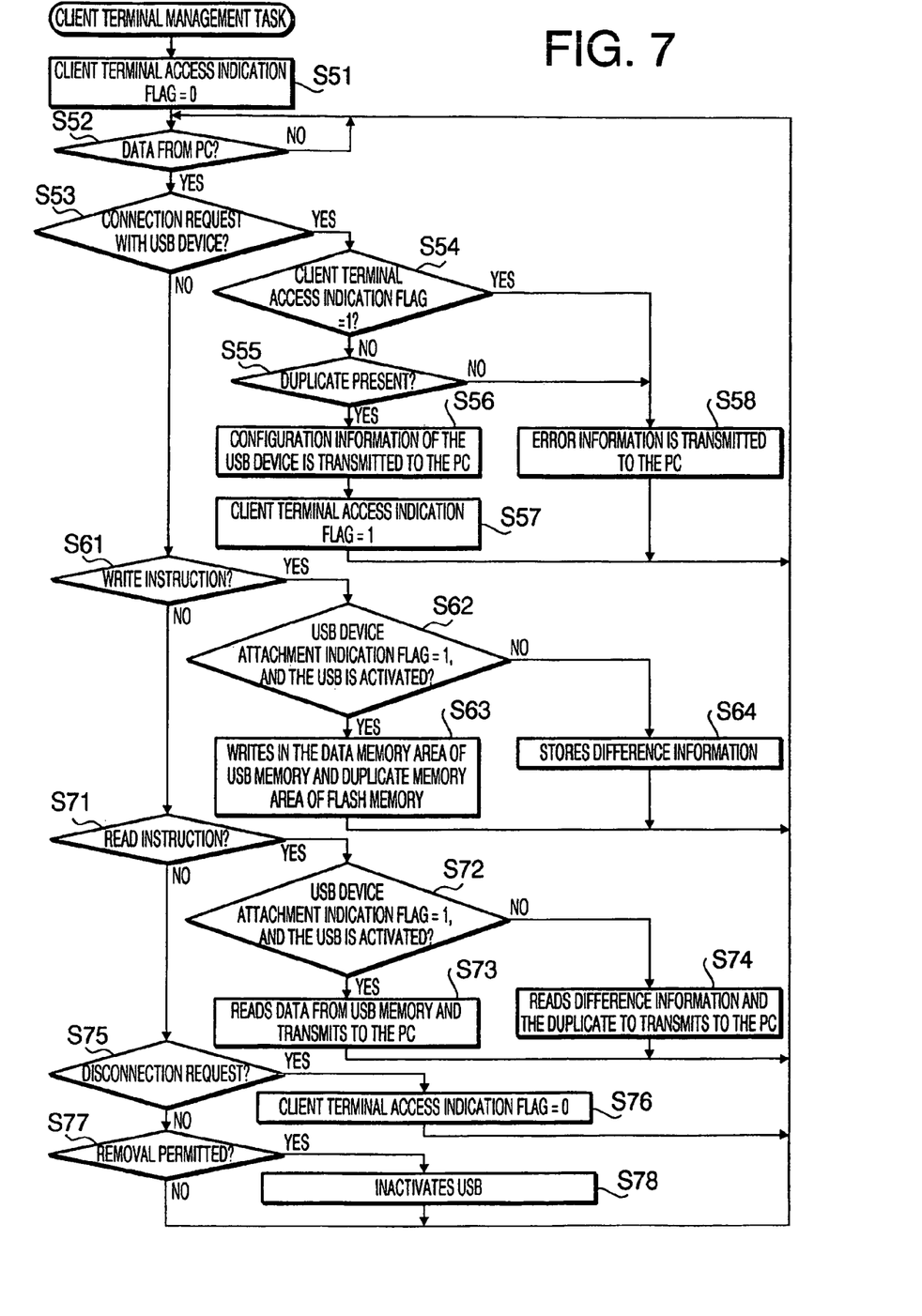
FIG. 7 is a flowchart to illustrate a client terminal management task to be performed by the MFP according to the embodiment of the present invention.

Next, with reference to FIGS. 5-7, processes to be performed by the MFP 1 according to the embodiment of the present invention will be described. The processes shown in FIGS. 5-7 are initiated upon activation of the MFP 1 and respectively performed time-divisionally in parallel.

Figure 5:
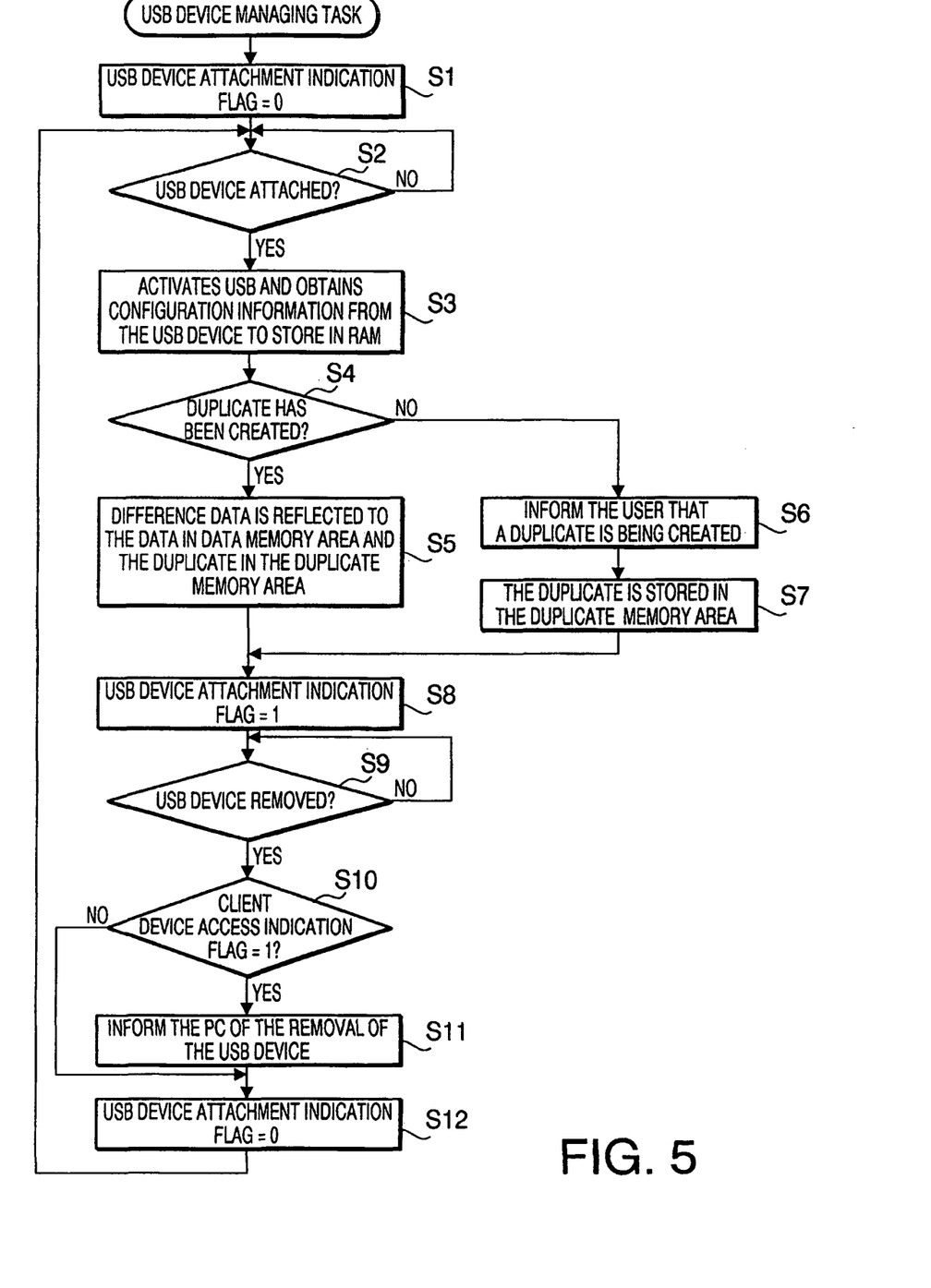
FIG. 5 is a flowchart to illustrate a USB device management task to be performed by the MFP according to the embodiment of the present invention.

FIG. 5 is a flowchart to illustrate a USB device management task to be performed by the MFP 1 according to the embodiment of the present invention. When the USB device management task starts, in S1, the USB device attachment indication flag in the USB device flag memory area 3a is initialized to zero. The USB device attachment indication flag indicates as to whether the USB device is attached to the USB I/F 8. When the USB device is attached, the USB device attachment indication flag is set to be 1. When no USB device is attached, the USB device attachment indication flag is set to be zero.

Following S1, in S2, it is judged as to whether the USB device, i.e., the USB memory 40, is attached to the MFP 1 through the USB I/F 8. If no USB device is attached (S2: NO), S2 is repeated. If the USB memory 40 is attached (S2: YES), in S3, the MFP 1 activates a USB (not shown) and obtains configuration information of the USB memory 40 being attached. The obtained configuration information is stored in the RAM 3. In the present embodiment, activating the USB refers to establishing electrical connection between the USB device and the MFP 1 so that the USB device and the MFP 1 can exchange data with each other. The configuration information to be obtained from the USB device refers to information to identify the USB device. The configuration information may include a type and an attribute of the USB device being attached. For example, if the USB device being attached is a USB enabled memory medium such as the USB memory 40, information indicating that the USB device is a memory medium, identifying data, a memory size, and access time of the memory medium may be included as the configuration information. The configuration information obtained in S3 is stored in the RAM 3 so that the MFP 1 can communicate with the USB device based on the configuration information stored in the RAM 3.

Following S3, in S4, it is judged as to whether a duplicate of the data stored in the data memory area 40a of the USB memory 40 has been created and stored in the duplicate memory area 10a of the flash memory 10. In the present embodiment, when a duplicate is created, the duplicate to be stored in the duplicate memory area 10a is provided with identifying information, which is identical to identifying information of original data in the data memory area 40a of the USB 40. Therefore, when presence of the duplicate is judged, judgment is made based on difference between the identifying information of the duplicate and identifying information of the data in the data memory area 40a of the USB memory 40 being currently attached to the MFP 1. If the two pieces of identifying information coincide with each other, it is judged that the duplicate has been created. If the two pieces of identifying information do not coincide, it is judged that no duplicate has been created or stored in the duplicate memory area 10a.

In S4, if it is judged that the duplicate has been created and stored in the duplicate memory area 10a (S4: YES), in S5, difference data stored in the difference memory area 10b is reflected to the data stored in the data memory area 40a of the USB memory 40 and to the duplicate stored in the duplicate memory area 10a. The difference data stored in the difference memory area 10b includes difference between the data stored in the data memory area 40a of the USB memory 40 and the duplicated data stored in the duplicate memory area 10a. The difference between the two data can be caused when the user modifies the duplicated data in the duplicate memory area 10a after the USB memory 40 is disconnected from the MFP 1. When the user attempts to modify the duplicated data, the modification (i.e., the difference from the data in the data memory area 40a of the USB memory 40) is stored in the difference memory area 10b instead of the duplicate memory area 10a. The difference is stored in the difference memory area 10b on a file basis. Further, file names of modified files, newly created files, and deleted files are stored. When the USB memory 40 is again attached to the MFP 1, the newly created files are added to be stored in the data memory area 40a of the USB memory 40 and the duplicate memory area 10a of the flash memory 10. The modified files are replaced with existing files in the data memory area 40a of the USB memory 40 and the duplicate memory area 10a of the flash memory 10. Further, files having the file names of the deleted files are deleted from the data memory area 40a of the USB memory 40 and the duplicate memory area 10a of the flash memory 10. Thus, only modified data (including deleted data and added data) is reflected to the existing data in the data memory area 40a of the USB memory 40 and the duplicate memory area 10a of the flash memory 10. Therefore, the process to reflect the difference can be performed in shorter time than replacing the entire files in the data memory area 40a of the USB memory 40 and the duplicate memory area 10a of the flash memory 10.

In S4, if it is judged that no duplicate has been created or stored in the duplicate memory area 10a (S4: NO), in S6, the message as shown in FIG. 3B is presented to the user of the MFP 1 to inform that the duplicate is being created. In S7, the entire data stored in the data memory area 40a of the USB memory 40 is duplicated and the duplicate is stored in the duplicate memory area 10a. Following one of S5 and S7, in S8, the USB device attachment indication flag in the USB device flag memory area 3a is set to be 1.

In S9, it is judged as to whether the USB memory 40 is removed from the USB I/F 8. If the USB memory 40 remains being attached (S9: NO), S9 is repeated. If the USB device has been removed (S9: YES), in S10, it is judged as to whether a client terminal access indication flag in the client terminal flag memory area 3b is 1. If it is judged that the client terminal access indication flag is 1 (S10: YES), in S11, information corresponding to the message to inform the remote user of the PC 20 that the USB memory 40 has been removed is transmitted to the PC 20. When the client terminal access indication flag is not 1 (S10: NO) or following S11, in S12, the USB device attachment indication flag in the USB device flag memory area 3a is set to be zero. Thereafter, the flow returns to S2.

Next, referring to FIG. 6, a user operation management task will be described. FIG. 6 is a flowchart to illustrate the user operation management task to be performed by the MFP 1 according to the embodiment of the present invention. When the user operation management task starts, in S21, it is judged as to whether the client terminal connection check button 9e3 has been operated. When the client terminal connection check button 9e3 has been operated (S21: YES), in S22, it is judged as to whether a name of the PC 20, which is the client terminal accessing the USB memory 40, is stored in the RAM 3. Further, it is judged as to whether the USB is activated. In the present embodiment, the name of the PC 20 is stored in the RAM 3 when the PC 20 attempts to accesses the USB device for connection. The process to store the name of the PC 20 in the RAM 3 will be described later in detail with reference to FIG. 7.

In S22, if it is judged that the PC 20 accessing the USB memory 40 is stored in the RAM 3 and the USB is activated (S22: YES), in S23, the message as shown in FIG. 3D to inform the user of the MFP 1 that a remote user who uses a client terminal to access the USB device exists is presented on the screen of the display 9a. When the name of the PC 20 accessing the USB memory 40 is not stored in the RAM 3 and/or the USB is not activated (S22: NO), in S24, the message to inform the user of the MFP 1 that no remote user who uses a client terminal to access the USB device is present is presented on the screen of the display 9a.

Following one of S23, S24, and negative judgment in S21 (S21: NO), in S25, it is judged as to whether the USB device removal preparation button 9e1 has been operated. If the USB device removal preparation button 9e1 has not been operated (S25: NO), the flow returns to S21. If the USB device removal preparation button 9e1 has been operated (S25: YES), in S26, it is judged as to whether the USB is activated. The judgment in S26 is made based on, for example, voltage of the power to be supplied to the USB being high or low.

If the USB is activated (S26: YES), in S27, it is judged as to whether the USB device attachment indication flag in the USB device flag memory area 3a is 1. If the USB device attachment indication flag is not 1 (S27: NO), in S28, the message (see FIG. 3A) to inform the user of the MFP 1 that no USB device is attached to the MFP 1 is presented on the screen of the display 9a. The flow returns to S21 thereafter. Meanwhile, in S27, if the USB device attachment indication flag is 1 (S27: YES), in S29, it is judged as to whether the client terminal access indication flag in the client terminal flag memory area 3b is 1. If the client terminal access indication flag is not 1 (S29: NO), in S30, the USB is inactivated. In the present embodiment, inactivating the USB refers to shutting down power supply to the USB device to electrically disconnect the USB device from the USB I/F 8 so that communication between the USB device and the USB I/F 8 is ceased. When the USB device is electrically disconnected from the USB I/F 8, the USB device can be safely removed from the USB I/F 8. Meanwhile, if the client terminal access indication flag is 1 (S29: YES), in S31, it is judged as to whether an instruction for forcible removal of the USB memory 40 is given by the user of the MFP 1. I.e., it is judged as to whether the forcible removal button 9e2 is operated after the operation to the USB device removal preparation button 9e1.

If the instruction is not given (S31: NO), in S32, an inquiry for approval to remove the USB memory 40 is transmitted to the PC 20, and the timer 2a is activated to time a predetermined period (e.g., 15 seconds). Thereafter, in S33, it is judged as to whether the USB device attachment indication flag is 1. If the USB device attachment indication flag is not 1 (S33: NO), it can be judged that the USB memory 40 is removed from the MFP 1 without approval of the PC 20. Therefore, in S34, information to notify the remote user of the PC 20 of the removal of the USB memory 40 is transmitted to the PC 20. The flow returns to S21 thereafter.

In S33, if the USB device attachment indication flag is 1 (S33: YES), in S35, it is judged as to whether the USB is activated. If the USB is activated (S35: YES), in S36, the predetermined period (15 seconds) timed by the timer 2a elapses. If the predetermined period remains (S36: NO), the flow returns to S33. If the predetermined period has elapsed (S36: YES), in S47, the USB is inactivated, and in S48, information to notify the remote user using the PC 20 that the USB memory 40 is no longer usable is transmitted to the PC 20.

In S31, meanwhile, if the instruction for forcible removal of the USB memory 40 is given by the user of the MFP 1 (S31: YES), S41, information to notify the remote user using the PC 20 that the USB memory 40 will be removed is transmitted to the PC 20, and the timer 2a is activated to scale a predetermined period of time (e.g., 10 seconds). Thereafter in S42, it is judged as to whether the predetermined period has elapsed. If the predetermined time has elapsed (S42: YES), in S47, the USB is inactivated, and the flow proceeds to S48.

In S35, if the USB is not activated (S35: NO), the flow proceeds to S48. The USB can be inactivated in S78 (see FIG. 7), which will be described later in detail.

Following one of S30, S48, and negative judgment in S26 (S26: NO), in S49 the message to inform the user of the MFP 1 that the USB device can be safely removed from the MFP 1 is presented on the screen of the display 9a. The flow returns to S21.

Next, referring to FIG. 7, a client terminal management task to be performed by the MFP 1 will be described. FIG. 7 is a flowchart to illustrate the client terminal management task to be performed by the MFP according to the embodiment of the present invention. When the client terminal management task starts, in S51, the client terminal access indication flag in the client terminal flag memory area 3b is initialized to zero. Thereafter, in S52, it is judged as to whether data is transmitted from a client terminal, i.e., the PC 20. If no data is transmitted (S52: NO), S52 is repeated. If data is transmitted from the PC 20 (S52: YES), in S53, it is judged as to whether the data includes a request to establish connection with the USB device. If the data includes the request for connection (S53: YES), in S54, it is judged as to whether the client terminal access indication flag is 1. In the present embodiment, a client name, i.e., a name of the PC 20, is included in the request for connection.

In S54, if the client terminal access indication flag is not 1 (S54: NO), in S55, it is judged as to whether a duplicate is present in the duplicate memory area 10a. If a duplicate is present (S55: YES), in S56, connection between the PC 20 and the USB memory 40 is established. In this step, further, the client name included in the request for connection being received in S52 is stored in the RAM 3, and the configuration information of the USB memory 40 is transmitted to the PC 20. Thereafter, in S57, the client terminal access indication flag is set to be 1.

Meanwhile, in S54, if the client terminal access indication flag is 1 (S54: YES), it can be judged that another client terminal is communicating with the USB memory 40. Therefore, in S58, error information to notify the remote user using the PC 20 that the USB memory 40 is currently inaccessible is transmitted to the PC 20. In S55, if no corresponding duplicate is present in the duplicate memory area 10a (S55: NO), it can be judged that no USB memory 40 to be connected with the PC 20 is present. Therefore, in S58, error information to notify the remote user using the PC 20 that the USB memory 40 is currently inaccessible is transmitted to the PC 20. Following S58, the flow returns to S52.

In S53, if the data received in S52 does not include a request for connection (S53: NO), in S61, it is judged as to whether the data received in S52 includes a write instruction to the USB memory 40. If the data includes a write instruction (S61: YES), in S62, it is judged as to whether the USB device attachment indication flag is 1 and the USB is activated. If the USB device attachment indication flag is 1 and the USB is activated (S62: YES), in S63, information is written in the data stored in the data memory area 40a of the USB memory 40 and the duplicated data in the duplicate memory area 10a of the flash memory 10 according to the write instruction received in S61. Thus, the contents of the data in the data memory area 40a and the data in the duplicate memory area 10a are conformed.

In S64, when the USB device attachment indication flag is not 1 and/or the USB is not activated (S64: NO), it can be judged that the USB memory 40 is currently inaccessible. Therefore, in S64, the write instruction received in S61 is reflected to the data in the difference memory area 10b so that the duplicated data in the duplicate memory area 10a can be maintained unmodified. Following one of S63 and S64, the flow returns to S52.

In S61, if the data received in S52 does not include a write instruction (S61: NO), in S71, it is judged as to whether the data includes a read instruction to read information from the USB memory 40a. If the data includes a read instruction (S71: YES), in S72, it is judged as to whether the USB device attachment indication flag is 1 and the USB is activated. If the USB device attachment indication flag is 1 and the USB is activated (S72: YES), in S73, the information stored in the data memory area 40a of the USB memory 40 is read out to be transmitted to the PC 20. In S72, if the USB device attachment indication flag is not 1 and/or the USB is not activated (S72: NO), it can be judged that the USB memory 40 is currently inaccessible. Therefore, in S74, the duplicated data stored in the duplicate memory area 10*a* is obtained to be transmitted to the PC 20. Following one of S73 and S74, the flow returns to S52.

In S71, if the data received in S52 does not include a read instruction (S71: NO), in S75, it is judged as to whether data received in S52 includes a request for disconnection of the PC 20 from the USB memory 40. If the data includes a disconnection request (S75: YES), in S76, the communication between the USB memory 40 and the PC 20 is disconnected, and the client terminal access indication flag is set to be zero. Thereafter, the flow returns to S52.

In S75, if the data received in S52 does not include a disconnection request (S75: NO), in S77, it is judged as to whether the data includes information to approve removal of the USB memory 40 from the MFP 1. If the data includes the information concerning the approval (S77: YES), in S78, the USB is inactivated, and thereafter, the flow returns to S52. Meanwhile, in S77, if the data does not include the information concerning the approval (S77: NO), the flow returns to S52.

Figure 8:
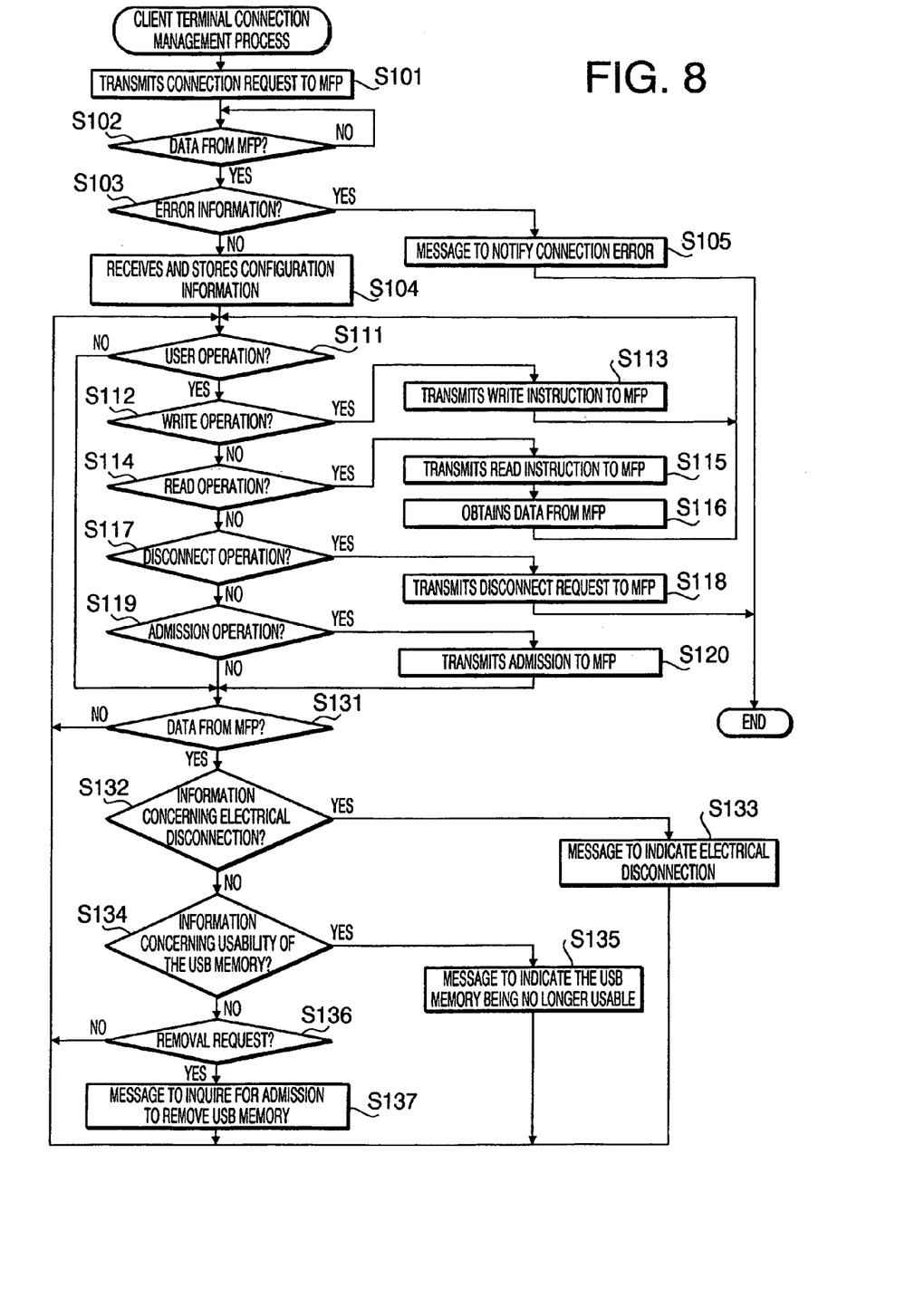
FIG. 8 is a flowchart to illustrate a client terminal connection management process to be performed by the PC according to the embodiment of the present invention.

Next, referring to FIG. 8, a client terminal connection management process to be performed in the PC 20 according to the embodiment of the present invention will be described. FIG. 8 is a flowchart to illustrate the client terminal connection management process to be performed by the PC according to the embodiment of the present invention. The client terminal connection management process is included in an application program and started when the application is activated. When the process starts, in S101, the PC 20 transmits a request for connection with the USB memory 40 to the MFP 1 through the LAN 50. Thereafter, in S102, it is judged as to whether data transmitted from the MFP 1 is received. If no data is received (S102: NO), S102 is repeated. In S102, if data is received (S102: YES), in S103, it is judged as to whether the received data includes error information to notify the remote user using the PC 20 that the USB memory 40 is currently inaccessible. If the received data includes error information (S103: YES), in S105, the message as shown in FIG. 4C to inform the remote user using the PC 20 that the USB memory 40 is inaccessible is presented on the screen of the display 25. Thereafter, the client terminal connection management process is terminated. In S103, if the data received in S102 does not include error information (S103: NO), in S104, the PC 20 receives the configuration information of the USB memory 40 transmitted from the MFP 1 to store in the RAM 22.

Following S104, in S111, it is judged as to whether an operation is performed on the PC 20 through the operation unit 27 by the remote user using the PC 20. If an operation is performed (S111: YES), in S112, it is judged as to whether the operation is a write operation to modify the data stored in the data memory area 40*a* of the USB memory 40. If the operation is a write operation (S112: YES), in S113, the PC 20 transmits a write instruction corresponding to the write operation to the MFP 1. Thereafter, the process returns to S111. In S112, if the operation is not a write operation (S112: NO), in S114, it is judged as to whether the operation is a read operation to obtain the data stored in the data memory area 40*a* of the USB memory 40. If the operation is a read operation (S114: YES), in S115, the PC 20 transmits a read instruction corresponding to the read operation to the MFP 1, and in S116, the PC 20 receives information corresponding to the read operation transmitted from the MFP 1. Thereafter, the process returns to S111.

In S114, if the operation performed in S111 is not a read operation (S114: NO), in S117, it is judged as to whether the operation is a disconnect operation to terminate the communication between the USB memory 40 and the PC 20. If the operation is a disconnect operation (S117: YES), in S118, the PC 20 transmits a request for disconnection from the USB memory 40 to the MFP 1. The process is terminated thereafter. In S117, if the operation is not a disconnect operation (S117: NO), in S119, it is judged as to whether the operation performed in S111 is an operation to approve removal of the USB memory 40 from the MFP 1. If the operation is an operation to approve removal of the USB memory 40 (S119: YES), in S120, information concerning the approval is transmitted to the MFP 1. Following one of S120 and negative judgment in S111, in S131, it is judged as to whether data is transmitted from the MFP 1 through the LAN 50. If data is transmitted and received in the PC 20 (S131: YES), in S132, it is judged as to whether the data received in S131 includes information to notify the remote user of electrical disconnection between the USB memory 40 and the MFP 1. If the data includes the information concerning the electrical disconnection between the USB memory 40 and the MFP 1 (S132: YES), in S133, the message to inform the remote user of the PC 20 that the USB memory 40 has been removed is presented on the screen of the display 25. The process returns to S111 thereafter. In S132, if the data does not include the information concerning the electrical disconnection between the USB memory 40 and the MFP 1 (S132: NO), in S134, it is judged as to whether the data received in S131 includes information to notify the remote user using the PC 20 that the USB memory 40 is no longer usable. If the data includes the information concerning the usability of the USB memory 40 (S134: YES), in S135, the a message as shown in FIG. 4D to inform the remote user that the USB memory 40 is no longer usable is presented on the screen of the display 25. The message further includes information to notify that an operation to be given by the remote user through the PC 20 will be performed on the duplicated data, which is stored in the duplicate memory area 10*a* instead of the data stored in the data memory area 40*a* of the USB memory 40. The process returns to S111 thereafter.

In S134, if the data received in S131 does not include the information concerning the usability of the USB memory 40 (S134: NO), in S136, it is judged as to whether the data includes a request for approval to remove the USB memory 40 from the MFP 1. If the data includes a request for approval (S136: YES), in S137, the message as shown in FIG. 4A to inquire the remote user using the PC 20 for approval to remove the USB memory 40 from the MFP 1 is presented on the screen of the display 25. The process returns to S111 thereafter. Following one of negative judgment in S131 and S136, the process returns to S111.

As has been described above, the MFP 1 according to the embodiment of the present invention is configured such that the user of the MFP 1 operates the USB device removal preparation button 9*e*1 prior to removal of the USB memory 40 from the MFP 1. When the USB device removal preparation button 9*e*1 is operated, an inquiry for approval for removal of the USB memory 40 is transmitted to the PC 20. When the approval is transmitted from the PC 20 in return, the USB is inactivated so that the USB memory 40 can be safely removed from the MFP 1.

In the above embodiment, even when the approval from the PC 20 is not received in the MFP 1, the USB can be still inactivated after a predetermined period of time so that the USB memory 40 can be safely removed. If the user of the MFP 1 does not require the approval of the remote user using the PC 20, the USB can be inactivated with a request for forcible removal with the forcible removal button 9e2 so that the USB memory 40 can be safely removed.

Although an example of carrying out the invention has been described, those skilled in the art will appreciate that there are numerous variations and permutations of the networking apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the MFP 1 may be replaced with a networking apparatus, to which a USB memory can be detachably attached, with functions other than a printing function or a facsimile transmission/receive function.

For another example, although solely one PC 20 is connected with the MFP 1 in the above-described embodiment, a plurality of PCs 20 can be communicably connected with the MFP 1.

Further, the USB memory 40 being a USB device may be a digital camera and a memory card reader, which are connectable with the networking apparatus through a USB. Further, the communication standard is not limited to the USB, but may be other standards such as IEEE 1394 (Institute of Electrical and Electronic Engineers 1394).

Furthermore, the MFP 1 may be capable of being connected with a plurality of USB devices. In such a configuration, the MFP 1 may be provided with a plurality of storage areas to store the duplicated data and the difference data on the USB device basis. Each of the USB devices may be identified by a unique identification number such as a manufacturer's number and a serial number.

What is claimed is:

1. A networking apparatus electrically connectable with a removable device, which is configured to perform a predetermined function based on data received via the networking apparatus, and with an external terminal device through a local area network (LAN) so that communication between the removable device and the external terminal device can be established through the networking apparatus, comprising:
   a memory unit configured to store information concerning the external terminal device accessing the removable device;
   a removal instruction receiving unit configured to receive a disconnection instruction to electrically disconnect the removable device from the networking apparatus so that the removable device can be safely removed from the networking apparatus;
   an approval inquiry transmission unit configured to transmit an inquiry for approval for the removal of the removable device from the networking apparatus to the external terminal device indicated in the memory unit through the network when the disconnection instruction is received by the removal instruction receiving unit;
   an approval receiver unit configured to receive the approval for removal from the external terminal device through the network;
   a connection control unit configured to control electrical connection and disconnection between the removable device and the networking apparatus according to one of the approval from the external terminal device and timing scaled in the networking apparatus;
   a data storing unit configured to obtain data from the removable device, and to create and store a duplicate of the obtained data while the removable device is capable of functioning as a storage to store the data received via the networking apparatus and when the removable device becomes electrically connected to the networking apparatus;
   a first modifying unit configured to modify contents of the data in the removable device and the duplicate stored in the data storing unit according to a modifying instruction provided by the external terminal device through the network;
   a second modifying unit configured to only operates on the contents of the duplicate stored in the data storing unit by creating difference data based on the contents of the duplicate according to the modifying instructions provided by the external terminal device through the network, while maintaining the duplicate unmodified, the duplicate being conformed with the data stored in the removable device after the removable device is removed from the networking apparatus; and
   a disconnection unit configured to electrically disconnect the removable device from the networking apparatus based on the control of the connection control unit,
   wherein the first modifying unit is configured to be activated when the removable device is electrically connected with the networking apparatus and the second modifying unit is configured to be activated when the removable device is electrically disconnected from the networking apparatus.

2. The networking apparatus according to claim 1, wherein the disconnection unit is configured to electrically disconnect the removable device from the networking apparatus when the approval for removal of the removable device is received by the approval receiver unit.

3. The networking apparatus according to claim 1, comprising: a first timer unit configured to scale timing of a predetermined notice period in the networking apparatus, which starts when the approval inquiry transmission unit transmits an inquiry for approval to the external terminal device, wherein the disconnection unit is configured to electrically disconnect the removable device from the networking apparatus when the first timer unit registers the predetermined notice period.

4. The networking apparatus according to claim 1, comprising: a forcible removal preparation unit configured to prepare for safe removal of the removable device from the networking apparatus without the approval for removal from the external terminal device, wherein the disconnection unit is configured to electrically disconnect the removable device from the networking apparatus according to activation of the forcible removal preparation unit.

5. The networking apparatus according to claim 4, comprising: a forcible removal notifying unit configured to transmit notification that the removable device will be removed from the networking apparatus to the external terminal device through the network.

6. The networking apparatus according to claim 4, comprising: a second timer unit configured to scale timing of a predetermined announce period, which starts when the forcible removal preparation unit is activated, wherein the disconnection unit is configured to electrically disconnect the removable device from the networking apparatus when the second timer unit registers the predetermined announce period.

7. The networking apparatus according to claim 1,
   wherein the networking apparatus is configured to communicate with a plurality of external terminal devices through the network;

wherein the networking apparatus further comprises a connection information storing unit, in which information concerning at least one of the external terminal devices being connected with the removable device through the networking apparatus is stored in association with information concerning the removable device; and wherein the approval inquiry transmission unit is configured to transmit the inquiry for approval for the removable device from the networking apparatus to the at least one of the external terminal devices which is connected with the removable device through the networking apparatus based on the information stored in the connection information storing unit.

8. The networking apparatus according to claim 1, further comprising: an announcing unit configured to transmit an announcement to the external terminal device to inform that the removable device is unavailable to use when the removable device is electrically disconnected from the networking apparatus by the disconnection unit.

9. The networking apparatus according to claim 1, comprising: an updating unit configured to update the data stored in the removable device with the difference stored in the difference storing area when the removable device is once again connected with the networking apparatus so that the contents stored in the data storing unit of the networking apparatus and the contents stored in the removable device are conformed with each other.

10. A networking apparatus being electrically connectable with a removable device, which is configured to perform a predetermined function based on data received via the networking apparatus, and with an external terminal device through a local area network (LAN) so that communication between the removable device and the external terminal device can be established through the networking apparatus, comprising:

a data storing unit configured to obtain data from the removable device and create a duplicate of the obtained data when the removable device becomes electrically connected to the networking apparatus;

a first modifying unit configured to modify contents of the data stored in the removable device and the duplicate stored in the data storing unit according to a modifying instruction provided by the external terminal device through the network; and a second modifying unit configured to only operates on the contents of the duplicate stored in the data storing unit by creating difference data based on the contents of the duplicate according to the modifying instructions provided by the external terminal device through the network, while maintaining the duplicate unmodified, the duplicate being conformed with the data stored in the removable device after the removable device is removed from the networking apparatus, wherein the first modifying unit is configured to be activated when the removable device is electrically connected with the networking apparatus and the second modifying unit is configured to be activated when the removable device is electrically disconnected from the networking apparatus.

11. The networking apparatus according to claim 10, comprising: an updating unit configured to update the data stored in the removable device with the difference stored in the difference storing area when the removable device is once again connected with the networking apparatus so that the contents stored in the data storing unit of the networking apparatus and the contents stored in the removable device are conformed with each other.

12. The networking apparatus according to claim 11, comprising:

an approval inquiry transmission unit configured to transmit an inquiry for approval for removal of the removable device from the networking apparatus to the external terminal device through the network based on a preparation request provided by a user of the networking apparatus to prepare for safe removal of the removable device;

an approval receiver unit configured to receive the approval for removal from the external terminal device through the network;

a connection control unit configured to control electrical connection and disconnection between the removable device and the networking apparatus according to one of the approval from the external terminal device and timing scaled in the networking apparatus; and a disconnection unit configured to electrically disconnect the removable device from the networking apparatus based on the control of the connection control unit.

13. A non-transitory computer usable medium comprising computer readable instructions to control a networking apparatus electrically connectable with a removable device, which is configured to perform a predetermined function based on data received via the networking apparatus, and with an external terminal device through a local area network (LAN) so that communication between the removable device and the external terminal device can be established through the networking apparatus, by executing steps of:

storing information concerning the external terminal device accessing the removable device;

receiving a disconnection instruction to electrically disconnect the removable device from the networking apparatus so that the removable device can be safely removed from the networking apparatus;

transmitting an inquiry for approval for the removal of the removable device from the networking apparatus to the external terminal device through the network when the disconnection instruction is received;

receiving the approval for removal from the external terminal device indicated in the stored memory through the network;

controlling electrical connection and disconnection between the removable device and the networking apparatus according to one of the approval from the external terminal device and timing scaled in the networking apparatus;

obtaining data from the removable device and creating and storing a duplicate in a data storing unit of the obtained data while the removable device is capable of functioning as a storage to store the data received via the networking apparatus and when the removable device becomes electrically connected to the networking apparatus;

modifying contents of the data in the removable device and the duplicate stored in the data storing unit according to a modifying instruction provided by the external terminal device through the network;

operating only on the contents of the duplicate by creating difference data based on the contents of the duplicate according to the modifying instructions provided by the external terminal device through the network, while maintaining the duplicate unmodified, the duplicate being conformed with the data stored in the removable device after the removable device is removed from the networking apparatus;

and electrically disconnecting the removable device from the networking apparatus based on the connection and disconnection control, wherein the modifying is performed when the removable device is electrically connected with the networking apparatus and the operating is performed when the removable device is electrically disconnected from the networking apparatus.

14. A non-transitory computer usable medium comprising computer readable instructions to control a networking apparatus being electrically connectable with a removable device, which is configured to perform a predetermined function based on data received via the networking apparatus, and with an external terminal device through a local area network (LAN) so that communication between the removable device and the external terminal device can be established through the networking apparatus, by executing steps of:

obtaining data from the removable device and creating a duplicate of the obtained data in a data storing unit of the networking apparatus when the removable device becomes electrically connected to the networking apparatus;

modifying contents of the data stored in the removable device and the duplicate stored in the data storing unit of the networking apparatus according to a modifying instruction provided by the external terminal device through the network when the removable device is electrically connected with the networking apparatus; and operating only on the contents of the duplicate stored in the data storing unit by creating difference data based on the contents of the duplicate according to the modifying instructions provided by the external terminal device through the network, while maintaining the duplicate unmodified, when the removable device is electrically disconnected from the networking apparatus, the duplicate being conformed with the data stored in the removable device after the removable device is removed from the networking apparatus.

* * * * *